June 4, 1935. B. SASSEN 2,003,557
HYDRAULICALLY CONTROLLED AUTOMATIC DIE SINKING MACHINE
Filed Aug. 17, 1932 5 Sheets-Sheet 1
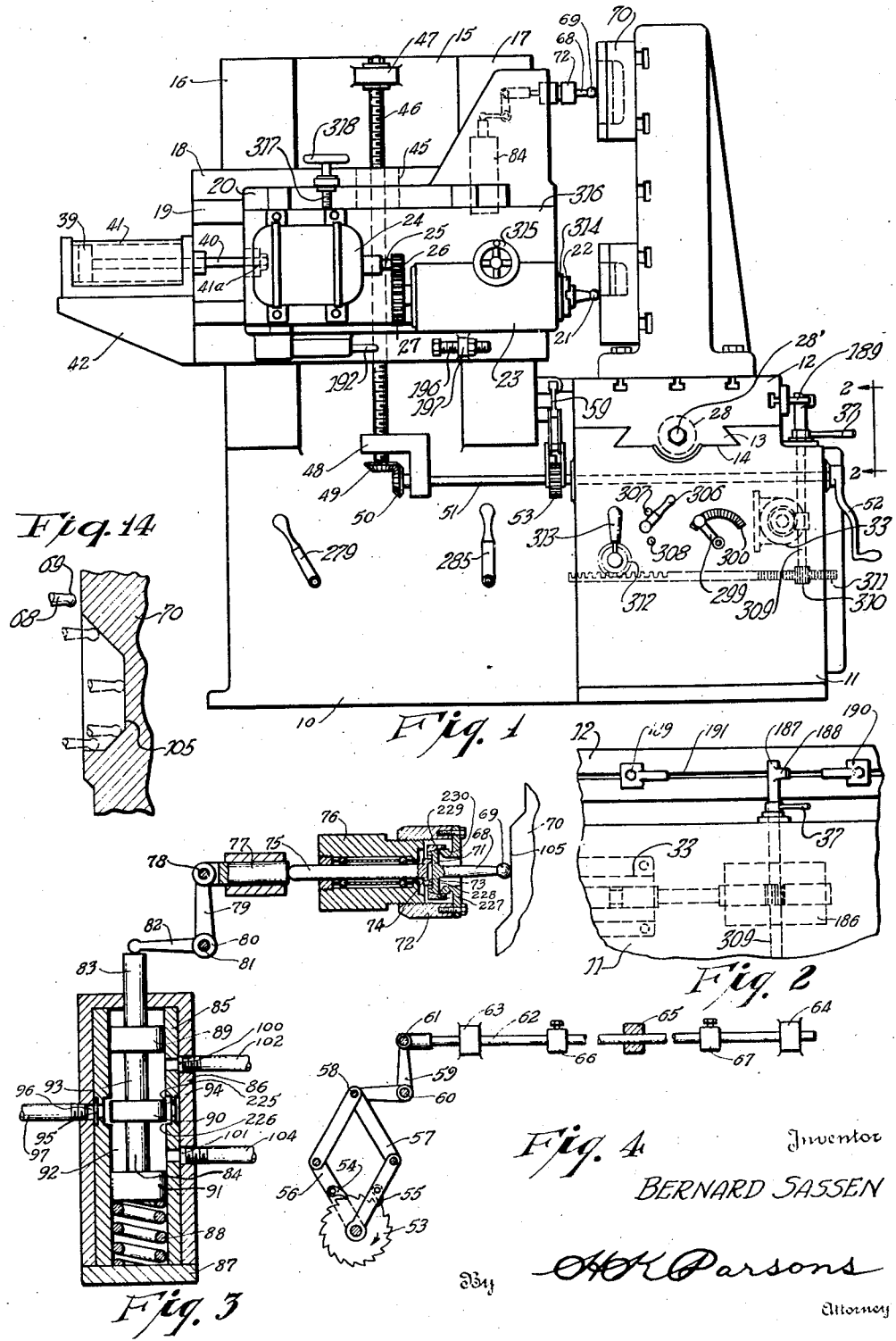
Inventor
BERNARD SASSEN
By AHParsons
Attorney Inventor
BERNARD SASSEN

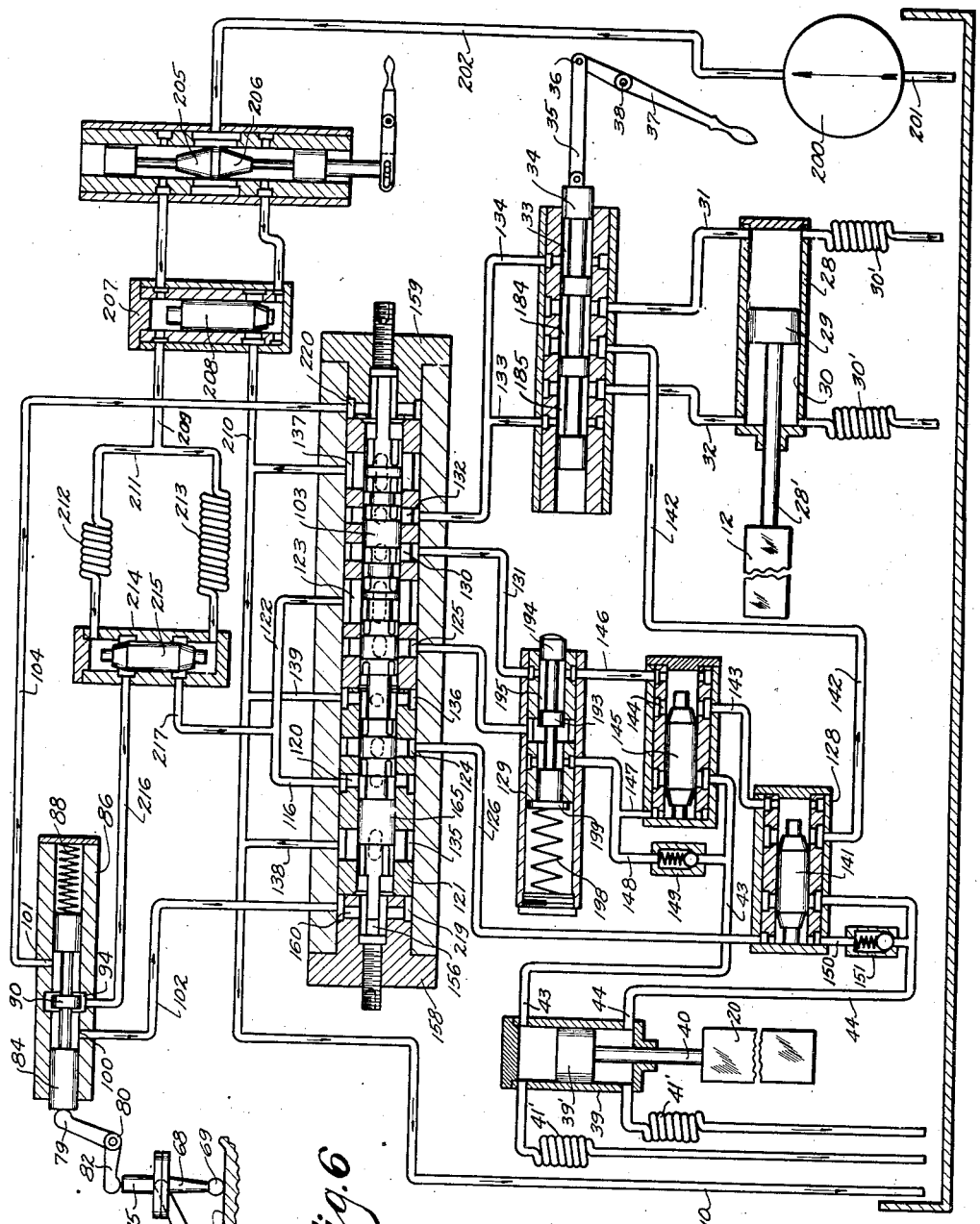

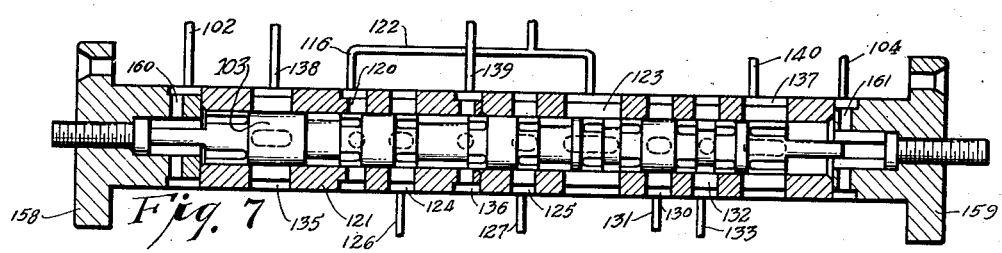
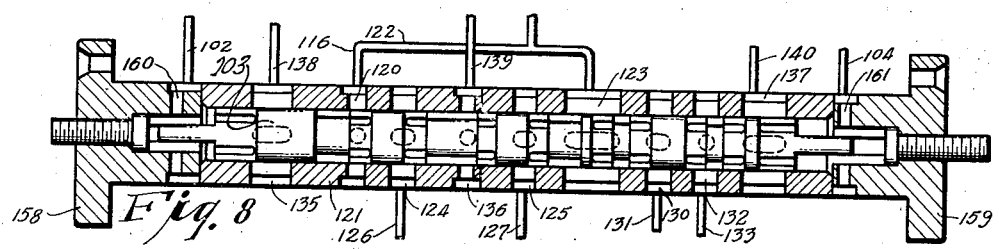
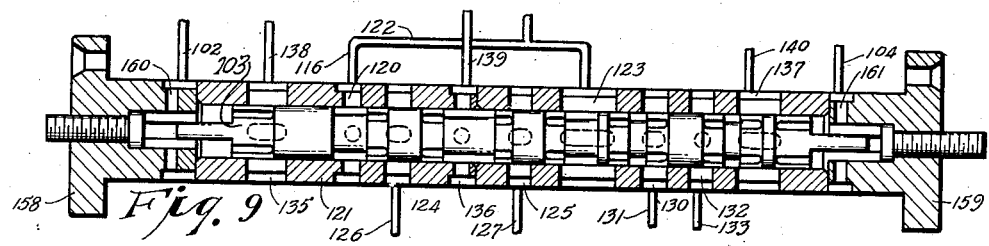
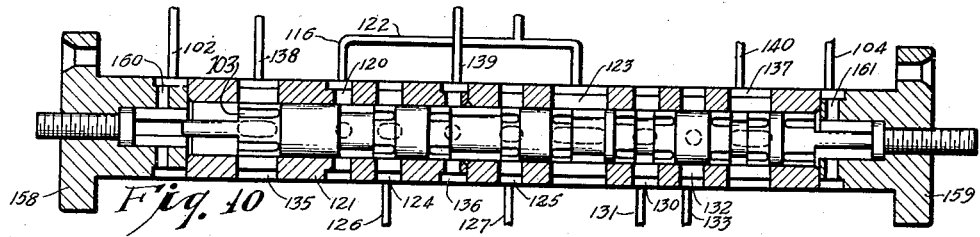
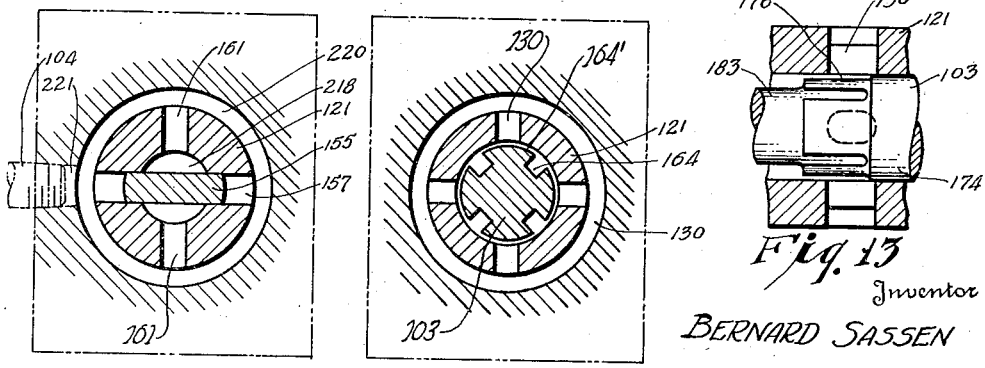

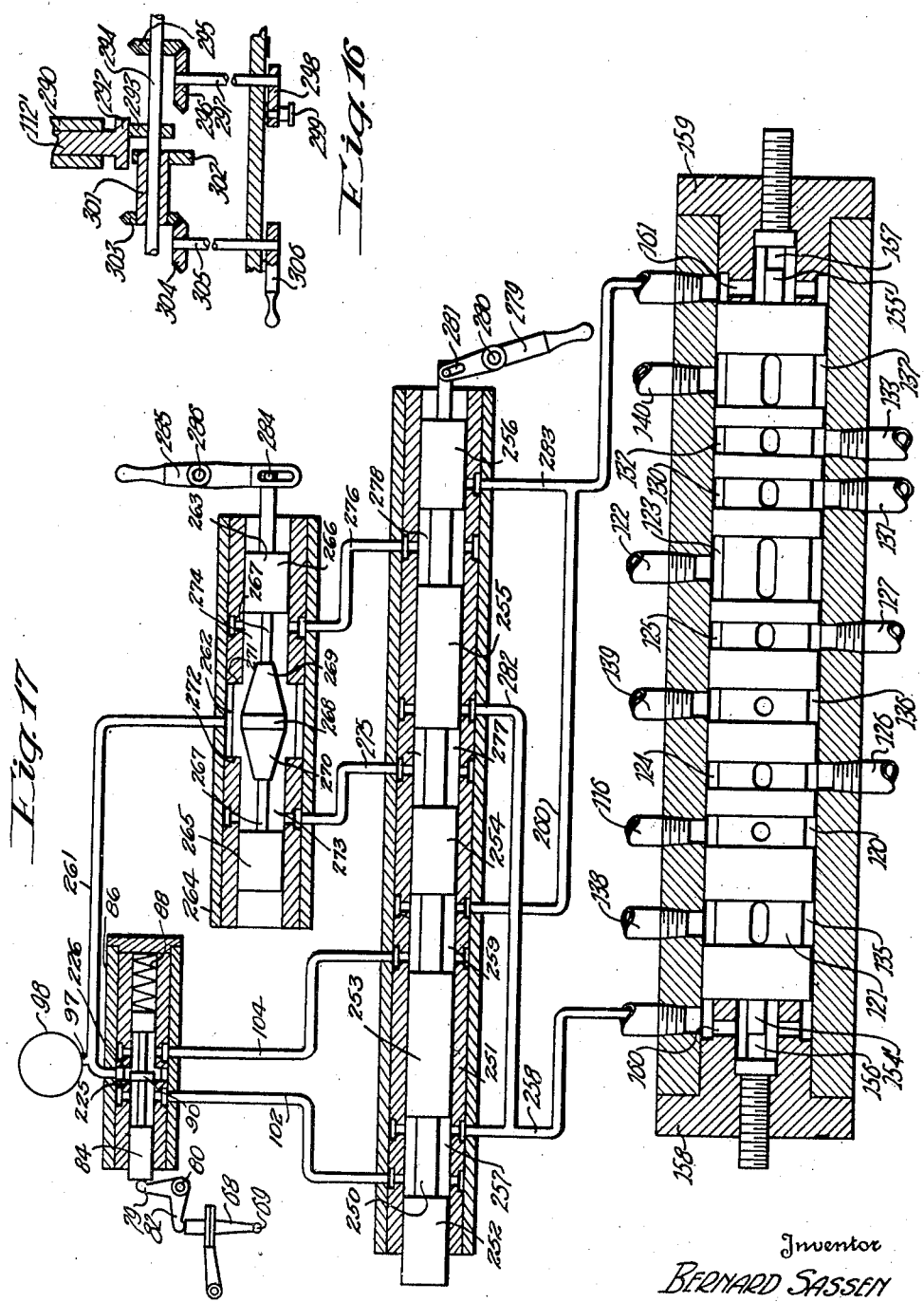

Patented June 4, 1935

2,003,557

UNITED STATES PATENT OFFICE 2,003,557

HYDRAULICALLY CONTROLLED AUTOMATIC DIE SINKING MACHINE

Bernard Sassen, Cincinnati, Ohio, assignor to The Cincinnati Milling Machine Company, Cincinnati, Ohio, a corporation of Ohio Application August 17, 1932, Serial No. 629,197

35 Claims. (Cl. 90—13.5)

This invention relates to improvements in machine tools and more especially to machines for the performance of profiling, contouring and diesinking or similar operations.

One of the principal objects of the present invention is the provision of improved actuating mechanism for the moving parts of the machine which will facilitate relative movement of the work and cutter in both straight and curvilinear paths for the formation of desired continuous contoured surfaces on the work.

A further object of the invention is the provision of improved automatic controls for the respective movements of the work and tool which will facilitate the accurate reproduction of a work piece in correspondence with a selected pattern and with a surface comparable both in shape and finish with that of the pattern being utilized A further object of the invention is the provision in connection with an hydraulically actuated machine of the character described including means for effecting relative hydraulic movement of the tool and work piece in a plurality of angularly related directions, of means for automatically maintaining the selected feed rate in given directions constant irrespective of the relative resistances to movement of the parts in said respective directions.

Another object of the invention is the provision in a machine of the character described of improved actuating mechanism for effecting a continuous uniform power flow to the parts to be shifted and including automatic control mechanism for varying the proportional distribution of said power to the individual units actuable thereby.

An additional object of this invention is to provide an improved hydraulic tracer control mechanism for machines of the character described in which the response of the parts controlled thereby is positive throughout the entire range of feed rates, thereby insuring maximum accuracy of reproduction of the pattern when high feed rates are utilized with attendant momentum of the parts controlled.

Another object of the present invention is the provision of an improved hydraulic actuating and control mechanism for machines of the character specified in which the variation in proportional distribution of actuating medium to the respective shiftable units for effecting a change in the resultant path of relative movement between cutter and work shall be directly proportional to the corresponding displacement of the pattern following tracer member.

Other objects and advantages of the present invention should be readily apparent by reference to the following specification considered in conjunction with the accompanying drawings forming a part thereof and it is to be understood that any modifications may be made in the exact structural details there shown and described within the scope of the appended claims without departing from or exceeding the spirit of the invention.

In the drawings:

Figure 1 is an elevational view of a machine embodying the improvements of this invention.

Figure 2 is a fragmentary elevational view of a portion of the machine shown in Figure 1 and as seen particularly from line 2—2 on Figure 1.

Figure 3 is a diagrammatic sectional view through the tracer and valve controlled thereby.

Figure 4 is a diagrammatic elevational view of the feeding mechanism for effecting the relative advancement of the parts at each complete stroke thereof.

Figure 6 is a diagrammatic view of a modified form of hydraulic circuit for completely controlling the movements of the parts and showing the distributor valve in the same position of adjustment as shown in Figure 5.

Figure 7 is a sectional view through the distributor valve and valve sleeve showing the distributor valve at one extreme position of adjustment.

Figure 8 is a sectional view through the distributor valve similar to Figure 7, but showing the valve in a position in between the positions shown in Figures 5 and 7.

Figure 9 is a sectional view similar to Figures 7 and 8 but showing the valve in a position between the position shown in Figure 5 and the extreme position shown in Figure 10.

Figure 10 is a sectional view similar to Figures 7, 8 and 9 but illustrating the valve at its other extreme position of adjustment opposite from that shown in Figure 7.

Figure 11 is an enlarged transverse sectional view through the distributor valve and its sleeve as seen from line 11—11 on Figure 5.

Figure 12 is an enlarged transverse sectional view through the distributor valve and its sleeve as seen from line 12—12 on Figure 5.

Figure 13 is an enlarged fragmentary elevational view of one of the slotted portions of the distributor valve forming a detail of the invention.

Figure 14 is a diagrammatic illustration of a pattern to be followed by the tracer during a traversing movement of the work and cutter.

Figure 16 is a diagrammatic illustration of means for operating the valve shown in Figure 15 and as seen particularly from line 16—16 on Figure 15.

Figure 17 is an hydraulic diagram of the manual means for effecting and controlling the operation of the machine.

Figures 5, 15:
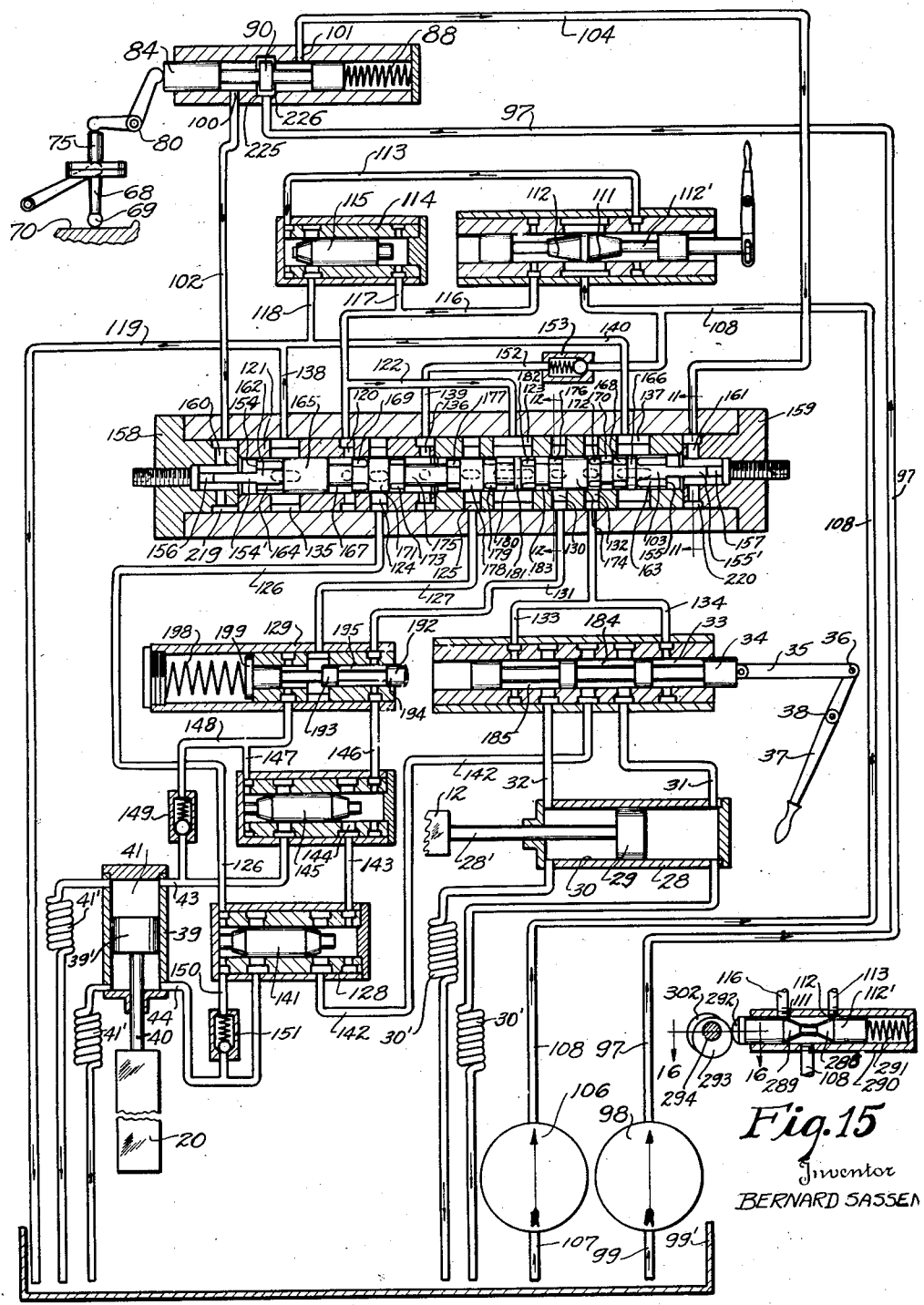
Figure 5 is a diagrammatic view illustrating the complete hydraulic circuit embodied in the invention and showing the distributor valve in one position of adjustment.
Figure 15 is a diagrammatic illustration of a balance valve as used in this invention.

In any machine intended for use in production of irregular profiled or contoured surfaces of such nature that they cannot be produced solely by individual straight line movements as is customary in ordinary milling machine practice, it is necessary that the work and tool operating thereon be supported for movement in two angularly related directions in a given plane such that the parts may be traversed one with respect to the other to cause the tool to move or be moved over the surface of the work and at the same time there must be a relative in and out movement or approach and retraction of the parts. By combinations of these two movements any straight or curvilinear surface may be formed on the work piece by the tool. These requirements are necessary in either what is known as profiling, when an outline or surface on the work is to be formed not in excess of the path of the operative surface of the tool, and is equally necessary in the case of contouring, when the surface to be produced is greater than that engageable by a single path of movement of the tool. In the latter event, however, it is necessary that a third relative movement be provided for displacing the path of movement by successive increments or the like such that the entire surface of the work which it is desired to machine will eventually be presented in operative relation to the tool.

In automatic machines such as those forming the subject matter of the present invention it is desirable that the control of these movements be entirely automatic as distinguished from individual manual adjustments for effecting the different movements of the parts. To accomplish this result, it has been customary in the prior art to make use of a pattern or guide corresponding to the shape to be produced on the work and some type of tracer or follower mechanism for engagement with the pattern or guide to determine the relative movement of the parts.

The present invention relates more particularly to an improved type of tracer mechanism which will satisfactorily follow patterns, whether of metal, wood or plastic materials, requiring relatively slight pressure contact between pattern and tracer, together with means for effecting appreciable amplification of the operative effect of the tracer movement rendering the control thereby of extreme sensitivity.

It is to be understood that in utilization of mechanism of this character the tracer and pattern must be maintained in engagement one with the other and the work and cutter must be correspondingly engaged and that the relative movement of work and cutter on the one hand and of pattern and tracer on the other, must be similar, although it will be understood that the actual amount of movement may be either the same or different as long as the proportions of movement in the several directions remain constant so that the desired shape is produced and of predetermined size in accordance with the relative proportions of movement.

The present invention contemplates the use of an hydraulic tracer device in which movement of the tracer point will be hydraulically converted with suitable amplification into mechanical movement for determining the coupling of the actuators with the several movable parts, which parts may comprise as independent jointly shiftable units either the cutter and tracer as one unit and the work and pattern as a second unit, or the pattern and cutter as a unit and the work and tracer as the other unit.

In the preferred form of the invention here illustrated not only the tracer, but also the several shifting mechanisms are hydraulically operated, use preferably being made of a predetermined volumetric hydraulic flow for effecting the relative movements of the units just mentioned one with respect to the other, it being understood that a portion of the movements in question may be transmitted to one unit and a portion to the other, or that one unit may be held stationary while a plurality of movements in different directions are transmitted to the opposed unit so long as the necessary relative approach and retraction and traversing movements are effected. In the present invention the determination of the rectilinear or curvilinear path of relative movement of the parts is effected by a variance in the proportional distribution of the constant hydraulic flow to the several individual actuators and the proportional distribution controlling member is hydraulically coupled with the movable tracer point in such manner that the variation in distribution will be in the nature of a constant or progressively changing action and directly proportional to the deflection of the tracer in following the contour of the pattern in place of a pulsating or intermittent action as has been characteristic of the known structures hitherto suggested.

It will therefore be understood that the embodiment of the invention shown in the accompanying drawings is utilized for purposes of illustration only of the general principles of the present invention, as their possible alternative applications will be evident from the foregoing description of the underlying principles of the present invention.

In these drawings the work and pattern have been shown as coupled together as one unit and the tracer and cutting tool as a second unit. The first unit is given a longitudinal or what may be termed traversing movement, and the second unit a movement of approach and retraction relative to the first during said traversing movement, both under control of the interengaged pattern and tracer, while additional means are provided for effecting a shifting of the second unit to cause the tracer and cutter to traverse different paths of the work and pattern in successive cutting operations in order that the desired contoured surface area may be produced on the work.

The machine as shown comprises a bed 10 having secured to one face thereof a support 11 having a work and pattern supporting table 12 mounted thereon. In order to guide the table 12 in its traversing movement it is provided with a dove-tail 13 received in a correspondingly shaped guideway 14 formed in the support 11. Rising above the bed 10 is a column 15 having formed on its one surface guides 16 and 17 for a slide 18 movable relative thereto. The slide 18 has formed on its forward face a guide 19 received in a suitable guideway formed on the adjacent face of a carriage 20 for movement transversely of the slide. The carriage 20 carries the tracer mechanism as well as the cutter. The cutter 21 is secured to the forward end of a spindle 22 journaled in a bearing 23 formed integral with or secured to the carriage 20. A variable speed motor or prime mover 24 is secured to the carriage 20 having its shaft 25 connected with the spindle 22 as by means of a pinion 26 and a gear 27, the former being secured to the motor shaft 26 while the latter is secured to a projecting portion of the spindle 22.

The table 12 and the parts supported thereby are arranged to be traversed by the motor generally designated by the reference numeral 28. This may consist of a piston 29 secured to the table by means of the piston rod 28'. The piston 29 is adapted to be actuated in opposite directions in its enclosing cylinder 30 carried by the support 11, for which reason it has secured respectively to its right and left hand ends, as seen in Figures 5 and 6, the conduits 31 and 32. The other ends of these conduits 31 and 32 terminate at a reversing valve casing 33 containing a spool type reversing valve 34. The valve 34, as seen in Figures 5 and 6, has secured to it one end of a link 35, its other end being pivoted at 36 to a lever 37. The lever 37 is pivoted intermediate its ends at 38 to a fixed part of the bed and through the lever 37 the valve may be manually shifted.

The carriage 20 is actuated toward and from the pattern and work by means of a motor 39, which may conveniently comprise a piston 39' having projecting from it a piston rod 40 connected, for example, at 41a to the rear end of the carriage 20. The piston 39' is enclosed within a cylinder 41 carried by a bracket or the like 42 attached to the rear end of the slide 18. The piston 39' is adapted to be reversely actuated through the cylinder 41 for which purpose it has, see Figures 5 and 6, respectively secured to its upper and lower ends conduits 43 and 44. Extending from the upper surface of each cylinder and from opposite ends thereof are suitable air bleeders which remove or drain all of the air from the system to insure continuous smooth operation of the machine. These air bleeders are shown diagrammatically in Figures 5 and 6, those associated with cylinder 41 are indicated by the numeral 41', while those associated with the cylinder 30 are indicated by the numeral 30'.

In order to effect the vertical adjustment of the slide 18 it is provided on its rear surface with a nut 45 in threaded engagement with an adjusting screw 46 journaled at its upper end in a bearing 47 carried by the column 15. The lower end of the screw is journaled in a bearing or bracket 48 attached to the column 15 beyond which the screw projects to receive a bevel gear 49. The gear 49 is meshed with a similar gear 50 on one end of a transverse shaft 51 journaled in the bracket 48 and support 11. For manually rotating the shaft 51 and thereby manually adjusting the position of the slide as for set-up purposes and the like, the end of the shaft 51 has secured to it a lever 52. During operation and to automatically incrementally adjust the slide 18, the shaft 51 carries intermediate its ends a ratchet 53 adapted to be actuated successively by pawls 54 and 55, see Figure 4. The pawls 54 and 55 are pivotally mounted respectively to toggle arms 56 and 57 which are connected by a common pivot 58 to one end of a bell crank 59. The bell crank 59 is pivoted at 60 to a stationary part of the machine and has connected to its other arm as at 61 a slide rod 62. The rod 62 is slidable through bearings 63 and 64 provided by the column 15 and is also slidable through an ear or lug 65 projecting from the adjacent side of the work table 12. Adjustably secured to the rod 62 are dogs 66 and 67 adapted to be engaged by the lug or ear 65 during the travel of the table 12 for axially shifting the rod 62 and oscillating the bell crank 59. The reverse movement of the table is accomplished automatically through a load and fire mechanism which has associated therewith the usual lost motion mechanism thereby providing a definite amount of table movement prior to each reversal. It is during this interval of movement that the dogs 66 or 67 are engaged for effecting the incremental feed, therefore, by varying the positions of the dogs 66 and 67 the amount of incremental feed for each table reversal may be varied.

With the table travelling to the right, as seen in Figure 4, the lug or ear 65 would engage the dog 67 and shift the rod 62 to the right, thereby oscillating the bell crank 59 in a clockwise direction causing the toggle arms 56 and 57 to straighten out, which through the arm 56 and its pawl 54 would rotate the ratchet 53 in a clockwise direction, the pawl 55 idly riding over the teeth of the ratchet. Reverse movement of the table 12 or to the left would effect engagement between the lug 65 and dog 66 thereby oscillating the bell crank in a counterclockwise direction tending to spread the toggle arms 56 and 57 outwardly. This would cause the pawl 55 which was elevated by the previous movement of the bell crank to engage behind the tooth on the ratchet to rotate the ratchet again in a clockwise direction while the pawl 54 now is idly returned. From this it will be seen that reciprocation of the slide rod 62 in either direction effects rotation of the ratchet 53 in a constant clockwise direction, which through the shaft 51, bevel gears 49 and 50, and screw 46 shifts the slide 18 in a given direction, thereby causing the tracer and tool to engage with successive vertically displaced paths or zones of pattern and work.

The tracer mechanism illustrated in detail in Figure 3 comprises a tracer arm 68 having a ball end 69 that contacts with the pattern 70. The tracer arm 68 is provided on its inner end with an enlarged head 71 to which is secured a ring 227 to thereby form a recess 228 having a sharp corner 229 at the end thereof where the head 71 and ring 227 are joined together. Contacting with the sharp corner 229 is a knife edge formed on the end of a flange 230 integral with or secured to a sleeve or cap 72. The inner surface of the head 71 engages a knife edge contact band 73 formed integral with the enlarged flange or head 74 formed on the end of a plunger 75. The plunger 75 is mounted for sliding movement through anti-friction bearings carried by a housing 76 secured to or formed integral with the carriage 20. The inner end of the plunger 75 engages the adjacent end of a slide 77 pivoted at 78 to one arm 79 of a bell crank 80. The bell crank 80 is pivoted at 81 to the carriage and has its other arm 82 in contact with the valve stem 83 of a valve indicated generally by the numeral 84. The valve 84 is enclosed within a valve sleeve 85 pressed into a casing 86 secured to or formed integral with the carriage 20. One end of the casing 86 is closed by a head or cap 87 against which abuts one end of a spring 88 abutting on its other end with the end of the valve plunger 84 tending to yieldably elevate said plunger, as seen in Figure 3. This movement of the valve 84 in an upward direction oscillates the bell crank 80 clockwise about its pivot 81 and through the bar 77 and plunger 75 forces the head 71 of the tracer arm 68 against the flanged cap 72 for holding the tracer arm 68 in a neutral or horizontal position.

The valve 84 may be termed the primary valve controlled by the tracer arm and in turn controlling the division of flow of the hydraulic medium to a distributor valve which controls the flow of the medium to the several motors involved in this invention, as will later appear. As seen in Figure 3, the valve 84 comprises spool portions 89, 90 and 91 having between them cannelures 92 and 93. The sleeve 85 is provided interiorly thereof and in alignment with the valve spool 90 with a circumferential groove 94 of a width slightly in excess of the width of the spool 90. Extending through the sleeve 85 in alignment with the groove 94 are ports 95 in turn aligned with a port 96 through the valve casing 86. Connected with the port 96 is one end of a conduit or channel 97 which is connected at its other end to the discharge of a pump 98. The intake of the pump 98 is connected by a conduit or channel 99 to the sump from which the hydraulic medium is drawn.

As was mentioned above, the valve 84 is utilized for controlling the distribution of the flow of the hydraulic medium which passes from the valve through the ports 100 and 101 formed in the casing 86 and sleeve 85. The port 100 is connected by a conduit or channel 102 with the left hand end, as seen in Figure 5 of a distributing valve 103 while the port 101 is connected by a conduit or channel 104 with the right hand end of said valve. With the spool portion 90 of the valve 84 in a central position as respects the groove 94 and the valve 103 also in a central position, there will be a substantially equal division of flow of the fluid between the conduits 102 and 104. Under this condition there will be equal pressures on the opposite ends of the valve 103 and thus there will be no force tending to move the latter from its central position. Shifting of the valve 84 to either the right or left, as seen in Figure 5, disturbs the equal division of the fluid and causes more fluid to flow through one of the conduits 102 and 104 than through the other and thereby shifts the valve 103 to either the right or left of its central position, as will be more fully explained hereafter.

The shifting of the valve 103 controls the quantity of flow per unit of time to the hydraulic motors 28 and 39 to determine the rates at which they will be operated and consequently the rate at which the work table 12 is moved relative to the cutters and the rate at which the carriage 20 is moved to shift the cutter toward and from the work while operating thereon. In addition, the position of the valve 103 determines whether the tool is moved toward the work or from the work.

The shifting of the valve 84, and therefore also of the valve 103 is accomplished as follows: With the tracer ball 69 removed from contact with the master pattern, the primary valve 84 would be shifted by the spring 88 completely to the left, as seen in Figure 5, so that the maximum flow from the line 97 is through the port 101 and conduit 104 for shifting the valve 103 to its extreme left hand position. As the tracer approaches and contacts with, for example, the vertical face 105 of the pattern, the valve 84 is shifted to the right as viewed in Figure 5 against the yielding resistance of spring 88 thereby gradually closing off the flow of the fluid through the conduit 104 while gradually increasing the flow to the port 100 and conduit 102 so that the valve 103 is gradually shifted to the right, as seen in Figure 5. This movement would continue in the absence of over-run or balancing of the circuits, as will later appear, until the valve 103 is shifted to its extreme right hand position. The function of the several positions of the valve will be later described.

Hydraulic actuating force is supplied to the cylinders 41 and 30 by a pump 106 which has its intake side connected by a suction conduit 107 with the sump 99'. The discharge side of the pump 106 is connected by a conduit 108 with a pair of variable fluid resistances 111 and 112. The fluid resistances 111 and 112 are formed by tapered spools on a valve plunger 112', see Figure 15, constructed in such a way that upon movement of the plunger in its sleeve in either direction the fluid resistance of one spool increases as the other decreases thus forming part of a speed control mechanism for determining the speed at which the parts may be actuated. The action of this valve is somewhat described below, but for a complete description thereof see co-pending application of Ernst and Sassen for Balanced pressure hydraulic circuit, Serial Number 490,154, filed October 21, 1930. The discharge of the pump 106 is thus divided into two portions, the ratio between the two fluid resistances 111 and 112 determining the proportion of the pump output which is to be returned direct to reservoir and the proportion which is to be utilized for machine actuation.

In order that the portion of the medium retained for actual use may remain substantially constant regardless of the variations in work resistance that may be encountered, the flow past spool 111 is connected by the conduit 113 with one end of the casing 114 containing a shiftable balance valve 115. As seen in Figure 5, the hydraulic medium flowing through the conduit 113 acts on the left hand end of the valve 115 and would tend to shift the valve to the right were it not for the pressure acting on the other end. The right hand end of the valve is connected by means of conduit 117 to conduit 116 which connects the flow past spool 112 to the port 120, and through branch line 122 to the port 123 of the distributor valve 103.

The pressure acting on the right hand end of the balance valve 115 will always be controlled by the fluid resistances coming after it which includes the work resistance of the motors 28 and 39. This pressure will thus tend to move the valve 115 to the left, and in so doing prevent flow taking place through the conduit 113. If this were to happen, the pressure in the line 113 would instantly be raised in value until it was equal to the pressure in the line 108. The latter must obviously be greater than the pressure in the line 116, since there is a pressure drop due to the throttled flow past spool 112.

A condition of equilibrium can only be obtained by throttling the flow through the tapered end of the balance valve 115, until the pressure in the line 113 is exactly equal to that in the line 116. As a result, the pressure drop across the fluid resistance 111 is at all times the same as that across the fluid resistance 112 and consequently for any given setting of the speed control valve 112', the division of flow is constant. The rate of movement of the motors 28 and 39 will thus be independent of the work resistance they may encounter.

The conduit 116 terminates at port 120 formed through a valve sleeve 121 that is positioned around the valve 103. A branch pressure line 122 extends from the line 116 and terminates in a port 123 formed in the valve sleeve 121. Ports 124 and 125 are formed through the valve sleeve 121 respectively adjacent the ports 120 and 123 which form one terminus for conduits or channels 126 and 127 respectively terminating at one end of a balance valve casing 128 and depth valve casing 129, the functions of which will be described in detail later. A port 130 formed through the valve sleeve 121 adjacent the port 123 forms one terminus for a conduit or channel 131 terminating at the depth valve casing 129. A port 132 adjacent the port 130 and formed through the valve sleeve 121 likewise is the terminus for a conduit or channel 133 which has its other end terminating in the reversing valve casing 33. A branch conduit or channel 134 connects the conduit 133 with a second portion of the valve casing 33. The valve sleeve 121 also has formed therethrough ports 135, 136 and 137 respectively forming the terminus for branch discharge conduits or channels 138, 139 and 140 each of which has its opposite terminus connected with the main discharge conduit or channel 119, which terminates in the tank or sump 99'.

The balance valve casing 128 encloses a shiftable valve 141 which controls outlet ports at each end of the casing 128 and from which respectively extend a conduit or channel 44 and a conduit or channel 142. The channel 44 terminating in the lower end of the cylinder 41, as seen in Figure 5, while the channel 142 terminates in the valve casing 33 of the reversing valve 34. Also connected with the valve casing 128 at its right hand end is a conduit 143 which has its other end connected with the right hand end of a second balance valve casing 144. The balance valve casing 144 encloses a balance valve 145 which is similar to the valve 141 and controls the discharge from opposite ends of said casing through the conduit 143 or the conduit 43. As was noted above, the conduit 43 connects with the upper end of the cylinder 41. Connecting with the opposite ends of the balance valve casing 144 are conduits 146 and 147 each terminating at their other end with the depth valve casing 129. Shunted between the conduit 147 and conduit 43 is a by-pass conduit 148 containing a check valve 149 whereby discharge fluid from the cylinder 41 may flow from conduit 43 into conduit 147 but the reverse flow being prohibited. Likewise shunted between the conduit 44 and the balance valve casing 128 is a by-pass conduit 150 having therein the check valve 151 allowing a flow of discharge fluid from the other end of the cylinder 41 through the conduit 44 into the casing 128, but prohibiting a reverse flow thereof.

Shunted across the main discharge conduit 119 and the conduit 108 from the pump 106 is a conduit or channel 152 in which is provided an emergency relief valve 153 to permit escape of fluid to the reservoir from the line 108 when the pump pressure exceeds a certain predetermined maximum. This valve thus does not come into play during normal operation of the circuit.

The valve 103 as was mentioned above, is axially shiftable through the sleeve 121 for which purpose it is provided with piston portions 154 and 155 which also serve as guides for prohibiting any rotative movement of the valve and for which purpose they are received in elongated slots 156 and 157 formed respectively in heads 158 and 159. The heads 158 and 159 being provided with ports 160 and 161 which terminate adjacent the ends of the slots 156 and 157. Adjacent the piston portions the valve has slightly reduced portions 162 and 163 in which are formed grooves 164. Adjacent the portions 162 and 163 are cylindrical spools 165 and 166 followed respectively by cannelure 167 and slotted portion 168. The valve is respectively provided adjacent the portions 167 and 168, with slotted portion 169 and cannelure 170 again respectively provided with a spool 171 and slotted portion 172 respectively adjacent slotted portion 173 and piston 174. The valve is then provided with the cannelure 175 next to the portion 173 and a slotted portion 176 adjacent the spool 174. Between the cannelure 175 and slotted portion 176, the valve from left to right has the slotted portion 177, spool or piston 178, slotted portion 179, cannelure 180, spool 181, slotted portion 182, and cannelure 183.

As will be later described in detail, the slotted portions of the valve are in reality reduced portions which act as resistances to the flow of the fluid and determine the amount of flow that passes into the conduits or lines extending from them. As the distributor valve is moved, more or less of the said reduced portions are uncovered and as the reduced portion controlling the flow of the fluid to the motor 39 to effect an infeed, for example, is made smaller the reduced portion controlling the flow of the fluid to the traverse motor 28 is increased. From this it will be seen that the speed at which the motors are operated will depend on the increase or decrease of the fluid resistances. Also that as the speed of one motor is increased the speed of the other is decreased to thereby accurately reproduce the pattern.

The operation of the device thus far described is as follows: As above noted, when the tracer arm ball end is free of the pattern the spring 88 actuates the valve 84 to the extreme left hand position, as shown in Figure 5, which position is determined by the adjustment of the flange cap 72 on the housing 66, which parts it will be noted from Figure 3, are threaded to one another. This adjustment is made so that a slight flow of fluid is at all times maintained in the conduit 102 for maintaining a slight pressure on the valve piston 154 although the major flow of the fluid is through the conduit 104. With this position of the valve 84, the distributor valve 103 will be shifted to its extreme left hand position, as seen in Figure 7. At this time, the flow from the pump 106 through the conduit 108 will, depending upon the desired rate of actuation of the parts, be divided between the conduits 109 and 110, the former discharging to the sump or tank while the latter discharges through the conduit 117. With the valve in its extreme left hand position, as seen in Figure 7, the port 120 will be cut off by the piston or spool 171 of the valve so that no flow is had through the conduit 126. The port 125 at this time will be open wide to receive the flow from the branch pressure line 122 by way of the cannelure 180. Also at this time the piston or spool 174 of the valve 133 will completely close off the port 130 thereby prohibiting any flow of fluid through the conduit 131. The flow of fluid through the port 125 and conduit 127 connected therewith will pass through the depth valve casing 129 and into and through the conduit 147 shifting the balance valve 145 to the right to open the port to the conduit 43 thereby permitting the entire effective flow of fluid into the cylinder 41. This will actuate the piston 39 through the cylinder 41 in a direction to cause the tracer arm and cutter to approach the pattern and work respectively. The exhaust from the other side of the piston 39' from the cylinder 41 is through the conduit 44, by-pass conduit 150, check valve 151, balance valve casing 128, conduit 126, port 124, grooved portion 173, cannelure 175, port 136 and branch exhaust conduit 139 to the main exhaust conduit 119 for return to the tank or sump. This movement of the parts continues until the tracer point 79 engages with the pattern 105.

Upon engagement of the tracer with the pattern the plunger 75 is axially reciprocated to the left, as seen in Figure 3, thereby actuating the valve 84 relative to its casing. Referring now to Figure 5, the movement of the valve 84 is to the right against the resistance of the spring 88. This movement causes the valve spool 90 of the primary valve 84 to be shifted relative to the groove 94 within the valve casing to thereby cut down the flow of fluid through the conduit 104 and increase the flow through the conduit 102. This change in the flow of the hydraulic medium effects a movement of the valve 103 to the right proportional to the movement of the tracer and primary valve, thereby causing the collar or piston 174 thereof to uncover the port 130 to initiate the movement of the table while at the same time the collar 178 is cutting off the flow through the port 125 to slow down the movement of the tracer and tool. Continued movement of the collars or piston portions 174 and 178 of the valve correspondingly increases the flow of the fluid through the conduit 131 and decreases the flow through the conduit 127. The decrease in the flow through the conduit 127 slows down the movement of the piston 39' relative to its cylinder while the flow through the conduit 131, passing through the cut depth valve casing 129, conduit 146, balance valve casings 144 and 128 into the conduit 142 increases the rate of movement of the piston 29. Depending upon the position of the reversing valve 34 the fluid in the conduit 142 is connected with either conduit 31 or conduit 32. As seen in the drawings, the conduit 142 is connected through the cannelure 184 of the reversing valve 34 with the conduit 31 thereby shifting the piston within the cylinder 30 and the table 12 connected therewith to the left. The exhaust from the other side of the piston 29 is discharged through the conduit 32 and connected by the cannelure 185 of the valve 34 with the discharge conduit 33 to the distributor valve where it is connected by the cannelure 170 with the branch discharge conduit 140 and main discharge conduit 119 with the sump.

As the tracer deflection increases the distributor valve will move to the position illustrated in Figure 8, at which time the tracer and cutter are actuated toward the pattern simultaneously with the movement of the table transversely of the tracer and cutter at equal rates of speed to cut for example, a surface extending at an angle of forty-five degrees. This movement of the parts continues until the tracer is further deflected as by a surface that is greater or less than forty-five degrees, which deflection further varies the position of the primary valve and the flow of fluid through the conduits 102 and 104. As the surface being followed by the tracer approaches a surface parallel to the line of movement of the table, the tracer and primary valve are deflected to a point for varying the flow of fluid through conduits 102 and 104 until the said surface, which is parallel to the line of movement, is reached whereupon the distributor valve is in the position shown in Figure 5, at which time the ports 124 and 125 are completely closed off by the piston or spool portions 171 and 178 of the valve, while the port 130 is fully open to the conduit 122, the fluid passing through the grooved portion 182, cannelure 183 and grooved portion 176. With the parts in this position no movement is imparted to the slide 20 carrying the tracer arm and cutter, while all movement is imparted to the table transversely of the tracer and tool. If the portion of the pattern engaged by the tracer is parallel with the movement of the table, no further shifting of the primary valve 84 will take place and consequently no change in the position of the valve 103 will result. If, however, a rise is encountered in the pattern by the tracer arm necessitating a withdrawal of the cutter or an outfeed thereof, the valve 84 will be still further shifted against the resistance of spring 88. This will again unbalance the flow in the lines 102 and 104 by increasing the flow in the line 102 and decreasing the flow in the line 104. This shifts the valve 103 further to the right to thereby uncover the port 124 to the pressure in line 116 so that a flow of the medium may be had through the cannelure 167, slotted portion 169 to the conduit 126, for initiating a reverse movement of the piston 39' and a slowing down in the movement of the piston 29.

During the previous operation of the parts the balance valve 145 was shifted relative to its casing to maintain the proper desired flow through the lines 127 and 131 so that the hydraulic motors for infeeding the tool and traversing the table are operated at proper speeds. During this operation the balance valve 141 is inoperative but upon reverse actuation of the motor 39 the balance valve 145 becomes inoperative and the valve 141 is utilized to maintain the proper division of flow as established by the position of the distributor valve. Therefore, as the primary valve is deflected from its position indicative of the surface parallel with the line of movement of the table, to a position to cause a withdrawal of the tool, or an outfeed thereof, the fluid in conduit 126 shifts the balance valve 141 to the right to cut down the flow through the casing 128 and the conduit 142 and thereby slow down the movement of the piston 29. At the same time the flow of the fluid through the line 126 is through the valve casing 128 into the conduit 144 against the opposite side of the piston 39'. This will effect a retraction of the slide 20 or a movement thereof to the left, as seen in Figure 1. If the rise is in a continuous angular line without a variation in the degree thereof the tracer arm 68 will be maintained at a definite position at which time no further movement of the valve 84 will take place and consequently no additional shifting of the distributor valve 103 will be had. If the surface being cut is on a forty-five degree angle the cutter or tool will be actuated from the work simultaneously with the traverse of the work at equal speeds wherefor the tracer will have deflected the primary valve to a point to shift the balance valve to the position illustrated in Figure 9 for equally distributing the flow of fluid to both of the motors 39 and 28. At this time then division of flow of the hydraulic medium to the cylinders 41 and 30 is maintained so that the cutter is moving outwardly at a given rate while the table is traversing the work relative to the cutter at the same rate, the resultant of which rates of movement is the angle of cut being reproduced from the pattern on the work, namely forty-five degrees. The exhaust from the upper end of cylinder 41, as seen in Figure 5, is by way of conduit 43, by-pass conduit 148, check valve 149, conduit 147, depth valve casing 129, conduit, 127, port 125, grooved portion 177, cannelure 175, port 136 and branch exhaust conduit 139 and the main exhaust conduit 119 to the sump.

If the tracer engages a rise or obstruction on the pattern such as a wall, for example, projecting substantially straight outwardly, the valve 84 will be shifted to its extreme right hand position and thereby shift the distributor valve to its extreme right hand position illustrated in Figure 10. At this time the spool or piston portion 181 and the spool or piston portion 178 respectively cut off the flow to the conduits 131 and 127 while the grooved portion 169 and cannelure 167 connect the medium with conduit 126, thereby stopping the movement of the table 12 while effecting the outward movement of the carriage 20.

In the operation of the machine the work table is traversed relative to the tool and tracer arm. At each end of the reciprocatory stroke of the table 12 the reverse valve 34 is actuated. For this purpose the valve stem 35 has secured to it a load and fire mechanism indicated generally by the numeral 186 which is of well known construction and needs no further explanation here. The load and fire mechanism is actuated by a vertical plunger 187 carried by the support 11, the plunger having projecting from it a tongue 188 adapted to lie in the path of movement of adjustable reversing dogs 189 and 190 adjustably secured in the usual T-slot 191 formed in the forward face of the table 12. During the interval of time required for the reversing of the valve by the dogs 189 or 190, as above described, the tongue or lug 65 projecting from the rear of the table engages with one of the dogs 66 or 67 on the rod 62 for actuating the bell crank 160 and thereby through the pawls 54 or 55 incrementally rotating the ratchet 53 and shaft 51 as was above described. The incremental rotation of the shaft 51 simultaneously rotates the screw 46 for thereby vertically adjusting the slide 18 relative to the column 15 so that the cutter and tracer are positioned for the next traverse thereof relative to the pattern and work. It is believed that this operation of the machine is readily understood from the drawings.

From the foregoing it will be noted that the sliding of the distributor valve, past the several ports, in the valve sleeve, through the slotted portions of the valve, effects the proper distribution of flow of the fluid to the motors for actuating said motors at different independent rates to thereby vary the line of cut on the work in accordance with the inclination of the pattern. This distribution of the hydraulic pressure, it will be noted, is maintained by the balance pressure valves 141 and 145 which shift as the flow to the opposite ends thereof varies. In the event a creeping tendency is had by either of the motors, which is not in accordance with the setting of the valve 103, the pressure on the ends of the balance valve would become unequal and the resultant higher pressure on the one side thereof would shift the valve and thereby again balance the flow through these valves and rectify any creeping or over-running tendency of the motors.

In the cutting of deep dies, it is impossible for the cutting tool to be sunk to the necessary or required depth to remove all of the material from the die cavity during a single pass of the tracer and tool relative to the pattern and work. It therefore becomes necessary that the material from the die cavity be removed in layers or steps. In the past this was accomplished by providing a plurality of dies each of a different depth so that the machine could be properly controlled while reproducing each successive portion of the die. By this invention it is not necessary to provide a plurality of patterns, as automatic means are included for limiting the depth of cut that can be made during a single reproducing operation. To this end the depth cut control valve was provided which includes the casing 129 having enclosed therein the valve plunger 192 having spool portions 193 and 194 forming the cannelure 195. As seen in Figure 1, the valve casing 129 is carried by the carriage 20 having the plunger 192 projecting from the end thereof. In the line of movement of the carriage 20 the slide 18 has an abutment in the nature of an adjustable screw 196 extending through a lug 197 on the slide 18. A spring 198 is enclosed within the casing 129 and abuts an enlarged headed end 199 of the valve for shifting it to its normal position, as seen in Figure 5.

The slide carrying the tracer and cutter may be fed into the work until the abutment 196 engages with the plunger 192 which shifts the valve against the yielding resistance of spring 198 to connect the line or conduit 127 with the conduit 146 and disconnect the line 127 from the conduit 147 thereby cutting off further movement of the piston 39' while permitting an unrestricted movement of the piston 29 to thereby cause the table to traverse the work relative to the tool without regard to the possible movement of the tracer and cutter slide as they are held against substantially immovable abutments. Continued movement of the parts will eventually again bring the tracer and pattern into contact with one another whereupon the valve 84 will be shifted for again shifting the distributor valve 103 and thereby retracting the carriage 20 so that the parts will again be under control of the primary valve 84. The tracer, work, pattern and tool are actuated relative to one another a plurality of times or the cycle of operation of the machine is repeated as often as it is necessary to finally bring the tracer into contact with the bottom of the pattern whereupon the die will be a complete and faithful reproduction of the pattern without the use of a plurality of graduated patterns.

In the modification shown in Figure 6, a single pump 200 is employed instead of the pumps 98 and 106. This pump is connected by a suction line 201 to the sump and discharges through a conduit 202 connected with a pair of branch conduits or channels 203 and 204 respectively terminating in the complementary variable fluid resistances 205 and 206. The flow past the resistances is connected to opposite ends of a balance valve casing 207 which encloses the valve 208. Extending from the casing 207 are conduits or channels 209 and 210, the latter extending to the tank or sump for returning the hydraulic medium not needed for the operation of the parts. The balance valve 208 and adjustable fluid resistances 205 and 206 constitute a rate controller for setting or adjusting the ultimate rate of flow of the hydraulic medium and determines the speed at which the parts are operated and takes the place of the valve 115 and resistances 111 and 112 disclosed in the circuit in Figure 5. For a complete description of their operation attention is invited to the description above and the co-pending application referred to in connection with the speed control parts of Figure 5.

The line or conduit 209 terminates at a transverse conduit or line 211 to the ends of which are connected fluid resistances 212 and 213, which may conveniently consist of lengths of small bore tubing or the like and which respectively terminate at the upper and lower ends of a balance valve casing 214. The casing 214 encloses a valve 215 which regulates and controls the discharge from the casing 214 through the conduits 216 and 217. The conduit 216 terminates in the primary valve casing 86 and is similar to the conduit 97 of Figure 5. The conduit 217 connects with the pressure line 116 of the circuit shown in Figure 5 and supplies the fluid that is utilized for shifting the pistons 29 and 39', as above described.

The balance valve 215 is acted upon on opposite ends thereof by the pressures developed by the fluid resistances 212 and 213 and takes up a position in accordance with these pressures acting on said opposite ends. The pressures at the said ends of the valve are not only dependent on the fluid resistances 212 and 213, but also on the work resistance encountered in the lines 216 and 217 as well as the resistance of the parts operated by the fluid in said lines 216 and 217. From this it will be seen that a variation in pressure at either end of the valve would cause it to shift its position toward the end of least pressure and thereby decrease or cut down the flow past this end of the valve and thereby increase the pressure at said end of the valve. This shifting of the valve would build up the pressure at that end of the valve toward which it is moved until the pressures at each end of the valve are equal and the valve is again held in equilibrium. In this manner the flow through the lines or channels 216 and 217 is maintained, which flow is in accordance with the fluid resistances 212 and 213 and the setting of the speed controller which includes fluid resistances 205 and 206. For a more complete description of the balance valve for maintaining the pressure in two motors or pressure lines, attention is invited to the co-pending application of Hans Ernst for Multiple hydraulic motor operation, Serial Number 614,980, filed June 2, 1932.

It should be noted that the difference between the size of the groove 94 and the width of the collar 90 is but a small amount and in fact there is but a few thousandths of an inch difference in their widths. From this it will be seen that comparatively high resistances are offered at 225 and 226 Figure 5 to the flow of the hydraulic medium even with the valve in its central position and with equal openings between the sides of the groove and the sides of the collar.

As shown in Figures 5 and 11 the valve heads 158 and 159 are each respectively provided with a slot 156 and 157 in which is received the tongue portions 154' and 155' of the valve. Centrally of the heads they are each provided with an enlarged bore 218 communicating through the radial ports 160 and 161 with grooves 219 and 220 respectively exteriorly of each of the heads 158 and 159. Communicating with the grooves 219 and 220 respectively, are the ports 221, to which are respectively connected the conduits 102 and 104.

In order for the fluid to pass from the valve casing 86 into the conduits 102 and 104 and into and from the chambers 156 and 157 respectively provided at the left and right hand ends of the distributor valve, it must flow through the fluid resistances 225 and 226 and fluid resistances 162 and 163, respectively formed by the grooved portions bearing the same reference numerals at the left and right hand ends of the valve. These resistances vary with the movement of the valves, thus when the valve 84 moves to the right, as seen in Figure 5, the resistance 226 increases and the resistance 225 decreases, or when the valve is at its extreme left hand position, as shown in Figure 5, the resistance 225 is at a maximum and the resistance 226 is at a minimum and conversely when the valve 84 is at its extreme right hand position the resistance 225 is at a minimum and the resistance 226 at a maximum. Also when the distributor valve 103 is at its extreme left hand position as shown in Figure 7, the resistance 162 is at a maximum and the resistance 163 is at a minimum, while when the distributor is in a substantially midway position, shown in Figure 5, these resistances are substantially equal. When the valve 103 is in its other extreme position, that is, to the right, as shown in Figure 10, the resistance 162 is at a minimum with the resistance 163 at a maximum. The flow of the fluid through each of the conduits 102 and 104 must therefore pass through two variable fluid resistances which are in serial relation to each other.

The portions of the distributor valve described as slotted portions are in reality reduced portions as compared with their adjacent enlarged piston portions, see Figures 12 and 13, the former being an enlarged sectional view through one of said slotted portions and the latter being an enlarged elevational view thereof and it is deemed sufficient if but one of said portions be described in detail. Accordingly, having particular reference to Figures 12 and 13, the spool or piston portion of the valve is substantially the same diameter as the bore through the sleeve while the slotted or reduced portion adjacent thereto is slightly smaller in diameter, which difference in size is in the nature of but a few thousandths of an inch on the radius thereof. By this construction a channel 164' of a width equal to the difference between the radius of the reduced portion and the radius of the bore through the sleeve is formed, which channel acts as a resistance to the flow of the hydraulic medium to and through the ports with which it is aligned. As seen in Figure 12, there are provided four ports through the valve being equally spaced from one another and by reference to Figure 13, it will be noted that the length of the reduced portion is greater than the largest dimension of the ports. From this it would follow that the resistance would be the orifice formed around the reduced portion and valve sleeve and this resistance would be substantially unvaried as the valve is shifted unless the end thereof passed the ends of the ports. For this reason the reduced portions are provided with end mill slots or grooves 222 which convey the medium from the cannelure adjacent the end of the reduced portion, and the resistance to the flow from the ports is formed by the channel disposed circumferentially of the reduced portion of the valve between the end mill slots and the ports. From this it will be seen that as the reduced portion is shifted relative to the ports the channel is increased in length for thereby varying the resistance to flow of the medium through the ports. As will be noted in Figure 12, the reduced portion of the valve is provided with end mill slots 222 in such a position as to be disposed intermediate adjacent ports so that the groove or slot will feed one of a pair of ports. In order that the flowing pressure through and from the ports is equal the valve sleeve is provided exteriorly thereof with a circumferential groove for connecting the said ports, as is usual practice. From the foregoing it will be noted that regardless of the axial position of the valve as respects the sleeve the same thickness of channel is at all times maintained, but as the reduced portion passes the ends of the ports, the length of the channel varies. In practice it has been found that with this type of valve the influence of the viscosity of the oil on the flow thereof is substantially equal at all points of adjustment of the valve whether the channel is of a great or a small length. Consequently, the relationship between the various fluid resistances remains the same regardless of changes in viscosity of the oil caused by temperature changes during practice, or by the use of different hydraulic mediums.

In order more fully to comprehend the action of this device, attention is invited to a condition where fluid is being positively forced through a stricture or fluid resistance, which may consist of an orifice or passage of small cross-section, at a given rate of flow. There will then be built up, at the point where the fluid enters the resistance, a pressure, which is a function of the rate of flow and the ability of the resistance to impede or resist flow.

This pressure may be increased by the following three methods:—

(a) by increasing the rate of flow without changing the resistance.

(b) by increasing the resistance (such as by reducing the area of the orifice or passage without changing the rate of flow).

(c) by increasing the viscosity of the hydraulic medium, without changing either the resistance or rate of flow.

A unit of fluid resistance may now be set up, which consists of the resistance to flow encountered by the passage of unit quantity in unit time at unit pressure. Such a unit will in all respects be similar to the electrical ohm and use may be made of a relationship, equivalent to Ohm's law, which may be written as follows:—

$$P = QR$$

Where P represents the unit pressure, Q is the rate of flow of unit quantity in unit time, and R is the resistance in units of resistance for a given viscosity of the hydraulic medium.

If, after passing through the first resistance, the flow discharges into a chamber filled with fluid already under pressure, which may be maintained at a given value by providing a second resistance, which permits the escape of fluid entering through the first resistance, then the pressure ahead of the latter, will have a value equal to the pressure in the second chamber, plus the pressure built up by the flow through the first resistance. The value P in the expression $P = QR$, may thus be made to represent the pressure drop across a resistance.

For any position of the primary valve 84, the fluid resistances 225 and 226 will have fixed values, assuming that the temperature of the hydraulic medium, and therefore its viscosity, is constant. Since friction is a negligible factor, due to the high pressure film lubrication afforded by the hydraulic medium, the valve 103 is freely slidable in its sleeve. Whenever the pressures in the lines 102 and 104 are unequal, therefore, there will be an unopposed resultant force acting on the piston areas formed by the ends of the valve. Under such conditions, the valve will thus be forced to move towards the end where the lowest pressure is present and, as previously explained, such movement will immediately cause an increase of the resistance at that end, and a complementary decrease in resistance at the other end. This in turn will cause the lower pressure to be increased, and the higher pressure to be decreased.

A position of equilibrium will thus be attained when the two pressures are substantially equal. When this is the case, the pressure drop across the resistances 225 and 226 will be equal, and that across 162 and 163 will likewise be equal.

If now the pressure in the line 97 is represented by $P_1$, and that in the lines 102 and 104 (now being equal) by $P_2$, and the resistance to flow through 225 by $R_1$ units of resistance, and through 226 by $R_2$ units of resistance, then the flow through 225:—

$$Q_1 = \frac{P_1 - P_2}{R_1}$$

and the flow through 226:—

$$Q_2 = \frac{P_1 - P_2}{R_2},$$

whence $$Q_1 R_1 = Q_2 R_2 \quad \text{------------} \quad (1)$$

All of the flow that passes through the resistance 225 is compelled also to pass through the resistance 162, since it has no other outlet. The flow through 162 is thus also $Q_1$ and if the resistance to flow at this point is $R_3$ units of resistance, and assuming the pressure in the line 138 to be zero, then:—

$$Q_1 = \frac{P_2}{R_3}$$

Similarly if $R_4$ is the resistance through 163 in similar units of resistance:—

$$Q_2 = \frac{P_2}{R_4},$$

whence $$Q_1 R_3 = Q_2 R_4 \quad \text{------------} \quad (2)$$

Combining the equations (1) and (2), we finally obtain the relationship:—

$$\frac{R_2}{R_1} = \frac{R_4}{R_3}$$

It will be noted that the various fluid resistances consist of long, narrow slits. It has been shown by experiment, that the resistance of such orifices is substantially directly proportional to the viscosity of the hydraulic medium. If the temperature of the system is thus changed, resulting in a change in the viscosity, the above relationship will remain unaffected; since such a change will affect the numerator and the denominator of the two fractions equally.

From the foregoing it will be seen that for any given position of the primary valve 84 the distributing valve 103 will automatically take up a corresponding definite position relative to its enclosing sleeve. The position of the distributor valve will be such that the ratio of the resistances 162 and 163 is always equal to the ratio of the resistances 225 and 226. Any deviation of the valve from this position will automatically cause unequal pressures in the chambers 156 and 157 which in turn will automatically restore the valve to its correct position. However, in order that the movement of the table 12 and the carriage 20 may be controlled by a minute movement of the tracer 69, the system should preferably be designed so that the valve 103 will be moved from its extreme left hand position to its extreme right hand position upon only a very small movement of the valve 84. This is accomplished by constructing the distributor valve 103 in such a way that it must be moved a much greater distance than the primary valve 84 in order to make the same change in the ratio between the resistances 162 and 163, as is made in the ratio between the resistances 225 and 226; thus a very slight movement of the primary valve 84 effects a large movement of the distributor valve 103. The ratio between the movements may thus be a few thousandths of an inch of movement of the primary valve for an inch or more of movement of the distributor valve; or of the order of several hundred to one. It is to be understood that this is by way of example only as the ratio may be of any desired value. From this it will be seen that the primary valve is extremely sensitive and that only a very slight movement of the latter is necessary to obtain a large movement of the distributor valve, the combined resistances 162 and 163 and 225 and 226, however, effecting a very accurate control of both the primary and distributor valves in accordance with the contour of the pattern being reproduced. It will also be noted that a very simple and effective hydraulic amplifying mechanism is thereby provided.

It will be noted that the return flow from the traversing motor 28 must pass through the resistances 172 and 168 in serial relation to each other in order to escape to the reservoir. When the valve 103 is at either end, as in Figures 7 and 10, the resistances 168 and 172 will alternately have, theoretically, an infinite value. As these resistances are in serial relationship the return flow from this motor will then be completely blocked, thus positively preventing any tendency to coast or over-run. In all other positions of the valve 103, this further serves to maintain a back pressure on the motor 28 to insure a smoothly controlled movement under all operating conditions.

In Figure 17 there is shown the mechanism utilized for set up purposes and to manually control the operation of the machine. As there shown, the distributor valve operating lines 102 and 104 instead of going directly to the ends of the distributor valve pass through a supplementary valve 250 that is enclosed within the usual valve casing 251. The valve itself may be provided with piston portions 252, 253, 254, 255 and 256 forming between each pair a cannelure. The cannelure 257 between the piston portions 252 and 253 directs the medium from the line 102 into a conduit 258 which terminates at the left hand end of the distributor valve casing. The line 258 is therefore a continuation of the line 102 with the valve 250 disposed between them. The cannelure 259 formed between piston portions 253 and 254 connects the line 104 with the conduit 260 which terminates at the right hand end of the distributor valve. This conduit 260 is therefore a continuation of the conduit 104 with the valve disposed between them.

The pump line, such as 202 in Figure 6, or 97 in Figure 5, has extending from it a branch pressure line 261 which terminates at its other end in an elongated port 262 formed in the casing of a manually controlled valve 263 that functions the same as the primary valve 84 except that considerably more movement must be imparted to it than the primary valve 84 to obtain the same result. The valve 263 serves the function of controlling the flow of pressure to the opposite ends of the distributor valve during setting up and when manually actuating the machine. This valve 263 is enclosed within a suitable casing 264 and the valve has formed thereon end piston guide portions 265 and 266 from which the reduced stem portion 267 extends. Intermediate the piston portions 265 and 266 the stem is provided as at 268 with an enlarged collar from opposite sides of which conical valves 269 and 270 extend. These conical portions of the valve respectively co-operate with shoulders 271 and 272 formed at the end of the intake port 262 for creating resistances which determine the amount of flow passing to opposite sides of the central portion 268 and depending upon the position of the same relative to the port 262. This valve in effect provides a pair of chambers 273 and 274, the former being formed between the piston guide portion 265 and central enlarged portion 268, and the latter being formed between the piston guide portion 266 and central enlarged portion 268. Extending from these chambers are conduits or lines 275 and 276 which respectively terminate at the valve casing 251 and respectively empty into the cannelure 277, formed between the piston portions 254 and 255, and the cannelure 278, formed between the piston portions 255 and 256.

The valve 250 is adapted to be axially reciprocated to the right from the position shown in Figure 17. Movement of the valve is accomplished by means of the lever 279 pivoted at 280 intermediate its ends and having a pin and slot connection 281 with the valve 250. Oscillation of the lever 279 in a clockwise direction will axially shift the valve to break the connection between the conduits 102 and 258 and 104 and 260 and dispose the branch conduits 282 and 283 in registry with cannelures 277 and 278. The conduits 282 and 283 respectively connect with conduits 258 and 260 and since the conduits 275 and 276 are in registry with the cannelures 277 and 278, the shifting of the valve will through the cannelures 277 and 278 respectively connect the lines 275 and 282 and lines 276 and 283. The distributor valve will under these circumstances be actuated by the division of flow effected by the valve 263 and hydraulic pressure passing through the line 261. In order to shift the valve 263 it is connected by means of a pin and slot connection 284 with a lever 285 pivoted at 286 intermediate its ends. As above described movement of the valve 263 will vary the resistances on each side of the enlarged central portion 268 of the valve for varying the amount of flow through lines 275 and 276 and in accordance with the above description this flow determines the position of the distributor valve and consequently the rate and direction of movement of the hydraulic motors controlling the machine parts.

From the foregoing it will be noted that there has been provided a valve which will connect the distributor valve with the hydraulic pressure source for either manual control of said valve or automatic control thereof by means of a pattern or other master.

In order to vary or adjust the speed of operation of the machine, the speed control mechanism includes a valve member 112' having the inclined conical portions 288 and 289 that co-operate with the conduits 116 and 113 and ports at the end thereof for determining the quantity of flow therethrough and consequently the portion which will be returned to reservoir. The valve 112' is enclosed within a valve casing 290 which in addition may have disposed therein a spring 291 tending normally to shift the valve to the left, as seen in Figure 15. In order to limit the movement of the valve under the influence of the spring and to definitely position same, the valve is provided on its free end with a head 292 adapted to engage with the periphery of an eccentric cam 293 keyed or otherwise secured to a shaft 294. The shaft 294 is suitably journaled in a fixed part of the machine and, as seen in Figure 16, may have secured to it intermediate its ends a bevel gear 295 in mesh with a pinion 296 secured to a shaft 297 which extends beyond the end of the table support 11. Secured to the projecting end of the shaft 297 is a lever 298 having in one end thereof a spring loaded detent 299 co-operating with a serrated plate 300 for locking the parts in their adjusted positions. From this it will be seen that operation of the lever 298 about the axis of the shaft 297 rotates the setting cam 293 to position the valve 287 relative to its casing and thereby effect the proper proportioning of the hydraulic medium from the line 108 to the lines 113 and 116.

In order to stop the movement of the motors, the valve 287 is adapted to be shifted against the resistance of the spring 291 for completely shutting off the flow through the conduit 116 and directing the entire flow through the conduit 113. It is frequently desired to stop the movement of the motors or the machine without changing the feed setting of the valve 287 or in other words without disturbing the setting of the cam 293. For this reason the shaft 294 has loosely journaled thereon a sleeve 301 to one end of which is secured a cam 302 while to the other end thereof is secured a bevel gear 303. The gear 303 is in mesh with a complementary bevel gear 304 secured to a shaft 305. The shaft 305 extends parallel with the shaft 297 and beyond the end of the table support 11. The extending portion of this shaft has secured to it a lever 306 adapted to have two positions, one shutting off the flow of the medium through the conduit 116, and the other for permitting the valve to take a position in accordance with the setting of the cam 193. These two positions may be readily determined by means of stop pins 307 and 308 between which the lever 306 is movable.

In order to manually reverse the reversing valve 34 from the end of the machine where the other control levers are located, the plunger 188, which co-operating with the dogs 189 and 190 automatically reverses the valve, has extending from it a shaft 309 to the end of which is secured a pinion 310 meshing with a shiftable rack bar 311. The other end of this bar is provided with rack teeth meshing with a pinion or gear 312 on a shaft manually operable by the lever 313 disposed exteriorly of the one end of the support 11.

It will be noted from Figure 1 that these manually operable levers are all disposed within convenient reach of the operator at one end of the bed and support so that the machine may be readily manually operated without the automatic feature, that the work and pattern supporting table may be manually reversed, the in and out feed of the tracer and tool manually reversed, and that the speed of these parts may be manually controlled.

In order to vary the relative positions of the cutter and tracer, the cutter spindle 22 may be conveniently disposed in a quill 314 adapted to be shifted relative to the housing 23 by means of the hand wheel 315. This adjustment of the quill will take care of horizontal adjustments between the cutter 21 and tracer 69 so that either may be projected beyond the other or aligned with one another.

To vary the axial approach of the cutter and tracer, the motor 24 and the spindle mechanism may be mounted on a subslide 316 for movement relative to the main slide 18. This relative movement being effected by means of a screw 317 having a threaded connection with the slide 316 and operated by a hand wheel 318.

It is believed from the foregoing description that the complete automatic and manual control of the improved hydraulically operated die sinker should be readily understood.

What is claimed is:

1. In a pattern controlled milling machine the combination with a bed, of a tracer, a pattern, and a cutter carried by the bed and adapted for relative movement, an hydraulic motor for effecting said movement of the parts in one direction, a second hydraulic motor for effecting the movement of the parts in an angularly related direction, a primary valve shiftable by the tracer in accordance with variations in the pattern, and a distributor valve operable by the primary valve to a position corresponding to the position of the tracer controlled valve for directing pressure to the motors.

2. In a pattern controlled milling machine the combination with a bed, of a tracer, a pattern, and a cutter carried by the bed and adapted for relative movement, an hydraulic motor for effecting said movement of the parts in one direction, a second hydraulic motor for effecting the movement of the parts in an angularly related direction, a primary valve shiftable by the tracer in accordance with variations in the pattern, a distributor valve operable by the primary valve to a position corresponding to the position of the tracer valve for directing pressure to the motors, and means operable by the movement of one of the parts for effecting a relative movement there-of in a third direction.

3. In a machine tool organization of the class described including a pattern, a tracer, and a tool adapted for relative movement, the combination of a pair of hydraulic motors for effecting the said movements, a valve for variably controlling the flow of an hydraulic medium between the hydraulic motors whereby a continuous operation by the motors either individually or jointly is had for shifting the parts, and means operable to definite positions by the tracer in accordance with the variations in the pattern for correspondingly positioning the valve.

4. In a machine tool organization of the class described including a pattern, a tracer, and a tool adapted for relative movement, the combination of a pair of hydraulic motors for effecting the said movements, a valve for variably controlling the flow of an hydraulic medium to the hydraulic motors whereby a continuous operation of the motors is had for shifting the parts and means operable to definite positions by the tracer in accordance with the variations in the pattern for correspondingly positioning the valve, said means including a primary valve operable in one direction by yielding means and in the other direction by the deflection of the tracer when in contact with the pattern.

5. In a machine tool organization of the class described including a pattern, a tracer, and a tool adapted for relative movement, the combination of a pair of hydraulic motors for effecting the said movements, a valve for variably controlling the flow of an hydraulic medium to the hydraulic motors whereby a continuous operation of the motors is had for shifting the parts and means operable to definite positions by the tracer in accordance with the variations in the pattern for correspondingly positioning the valve, said means including a primary valve operable in one direction by yielding means and in the other direction by the deflection of the tracer when in contact with the pattern, said valve and primary valve each having fluid resistances associated therewith to control the flow of hydraulic medium therethrough and to thereby control the position of the valve.

6. In a machine tool organization of the class described the combination of a bed, a tracer and tool carried thereby for unitary movement relative thereto, a pattern and work mounted on the bed for movement relative thereto and relative to the tracer and cutter, hydraulic motors for effecting said movements of the cutter and tool and work and pattern, an hydraulic medium connectible with opposite ends of said motors for reversely actuating said parts, a valve controlling the flow of the medium to said motors for effecting a continuous operation thereof, means for shifting the valve under the influence of the tracer and including a primary valve operatively connected with a source of hydraulic pressure, and means for balancing the pressure on each side of the valve for maintaining the proper position thereof.

7. In a control mechanism for pattern controlled milling machines the combination with a tracer, a tool, and a pattern supported for relative movement, of hydraulic motors for effecting said relative movement of the parts in angularly related directions, an hydraulic medium for operating said motors, a valve controlling the distribution of the flow of the medium to said motors and adapted to connect the medium with one or both of the motors to control the direction and relative rates of operation thereof, and means positionable by the tracer in accordance with the variations in the pattern for controlling the movement and position of the valve in accordance with the position of the tracer.

8. In a control mechanism for pattern controlled milling machines the combination with a tracer, a tool, and a pattern supported for relative movement, of hydraulic motors for effecting said relative movement of the parts in angularly related directions, an hydraulic medium for operating said motors, a valve controlling the distribution of the flow of the medium to said motors and adapted to connect the medium with one or both of the motors to control the direction and relative rates of operation thereof, means positionable by the tracer in accordance with the variations in the pattern for controlling the movement and position of the valve in accordance with the position of the tracer, and balancing valves between the valve and motors for maintaining the desired proportion of flow of the medium to the motors in accordance with the setting of the valve.

9. In a control mechanism for pattern controlled milling machines the combination with a tracer, a tool, and a pattern supported for relative movement, of hydraulic motors for effecting said relative movement of the parts in angularly related directions, an hydraulic medium for operating said motors, a valve controlling the distribution of the flow of the medium to said motors and adapted to connect the medium with one or both of the motors to control the direction and relative rates of operation thereof, means positionable by the tracer in accordance with the variations in the pattern for controlling the movement and the position of the valve, balancing valves between the valve and motors for maintaining the desired proportion of flow of the medium to the motors in accordance with the setting of the valve, and means for interrupting the flow of the medium thereto when the cutter reaches its maximum depth.

10. In a machine tool organization of the class described the combination with a tracer and tool supported for unitary movement in angularly related directions, and a table supporting the work and pattern for movement in angularly related directions relative to the tracer and tool, of hydraulic control means comprising an hydraulic motor for each of the units, a pressure source of greater volume than necessary for actuating the motors, speed control means for determining and effecting a division in the flow of the pressure source and for returning the portion thereof not needed to the sump, a valve controlling and distributing the remaining portion of the medium to the motors to control the direction and rates of operation thereof, and hydraulic means for effecting the positioning of the valve.

11. In a machine tool organization of the class described the combination with a tracer and tool supported for unitary movement in angularly related directions, and a table supporting the work and pattern for movement in angularly related directions relative to the tracer and tool, of hydraulic control means comprising an hydraulic motor for each of the units, a pressure source of greater volume than necessary for actuating the motors, speed control means for determining and effecting a division in the flow of the pressure source and for returning the portion thereof not needed to the sump, a distributor valve controlling and distributing the remaining portion of the medium to the motors to control the direction and rates of operation thereof, and hydraulic means for effecting the positioning of the distributor valve, including an independent pressure source, a primary valve connecting the pressure source with the distributor valve, and a connection between the primary valve and tracer arm whereby variations in the pattern operatively adjust the primary valve to vary the position of the distributor valve.

12. In a machine tool organization of the class described the combination with a tracer and tool supported for unitary movement in angularly related directions, and a table supporting the work and pattern for movement in angularly related directions relative to the tracer and tool, of hydraulic control means comprising an hydraulic motor for each of the units, a pressure source of greater volume than necessary for actuating the motors, speed control means for determining and effecting a division in the flow of the pressure source and for returning the portion thereof not needed to the sump, a distributor valve controlling and distributing the remaining portion of the medium to the motors to control the direction and rates of operation thereof, and hydraulic means for effecting the positioning of the distributor valve, including an independent pressure source, a primary valve connecting the pressure source with the distributor valve, and a connection between the valve and tracer arm whereby variations in the pattern operatively adjust the primary valve to vary the position of the distributor valve, said primary valve and distributor valve having fluid resistances associated therewith tending to restrict the flow of the medium therethrough, said resistances being complements of one another in each valve and the resistances of one valve bearing a definite ratio to the corresponding resistances of the other valve.

13. In a mechanism of the class described the combination with a tracer, a pattern and a tool adapted to have certain movements imparted thereto, of hydraulic motors for effecting said movements at desired rates, an hydraulic medium for actuating said motors, a distributor valve for determining the distribution of the flow of the hydraulic medium to said motors, a primary valve for directing the medium to the distributor valve for effecting its relative positions, and means including the tracer for shifting said primary valve in accordance with the variations in the pattern to thereby shift and position the distributor valve.

14. In a mechanism of the class described the combination with a tracer, a pattern and a tool adapted to have certain movements imparted thereto, of hydraulic motors for effecting said movements at desired rates, an hydraulic medium for actuating said motors, a distributor valve for determining the distribution of the flow of the hydraulic medium to said motors, a primary valve for directing the medium to the distributor valve for effecting its relative positions, means including the tracer for shifting said primary valve in accordance with the variations in the pattern to thereby shift and position the distributor valve, and means between the distributor valve and primary valve whereby any movement or adjustment of the primary valve simultaneously moves and adjusts the position of the distributor valve so that for any given position of the primary valve the distributor valve takes up a definite position.

15. In a mechanism of the class described the combination with a tracer, a pattern and a tool adapted to have certain movements imparted thereto, of hydraulic motors for effecting said movements at desired rates, an hydraulic medium for actuating said motors, a distributor valve for determining the distribution of the flow of the hydraulic medium to said motors, a primary valve for directing the medium to the distributor valve for effecting its relative positions, means including the tracer for shifting said primary valve in accordance with the variations in the pattern to thereby shift and position the distributor valve, and means between the distributor valve and primary valve whereby any movement or adjustment of the primary valve simultaneously moves and adjusts the position of the distributor valve so that for any given position of the primary valve the secondary valve takes up a definite position, said means comprising fluid resistances associated with the primary valve and secondary valve in serial relation to one another.

16. In a mechanism of the class described the combination with a tracer, a pattern and a tool adapted to have certain movements imparted thereto, of hydraulic motors for effecting said movements at desired rates, an hydraulic medium for actuating said motors, a distributor valve for determining the distribution of the flow of the hydraulic medium to said motors, a primary valve for directing the medium to the distributor valve for effecting its relative positions, means including the tracer for shifting said primary valve in accordance with the variations in the pattern to thereby shift and position the distributor valve, and means between the distributor valve and primary valve whereby any movement or adjustment of the primary valve simultaneously moves and adjusts the position of the distributor valve so that for any given position of the primary valve the distributor valve takes up a definite position, said means comprising fluid resistances associated with the primary valve and secondary valve in serial relation to one another, the ratio of the resistances of the primary valve being equal to the ratio of the resistances of the secondary valve so that any variation in pressure controlling the movement of the distributor valve will immediately effect a re-adjustment thereof to its proper position.

17. In a mechanism of the class described the combination with a pattern, a tracer and rotating tool adapted for movement relative to one another, of a plurality of hydraulic motors for effecting said movements in desired directions and at desired speeds, an hydraulic medium for actuating said motors, a shiftable distributor valve for controlling the flow of the medium to the motors and determining the direction of movement thereof, the valve being adapted to be shifted by the hydraulic medium acting on the opposite ends thereof, a primary valve for directing the flow of the medium to the opposite ends of said distributor valve in different quantities, fluid resistances associated with the primary valve and distributor valve for controlling the flow to the ends of the distributor valve, and connections between the primary valve, tracer and pattern whereby the position of the valve is varied in accordance with the contour of the pattern for controlling the flow of the medium which through the resistances associated with the primary and distributor valve instantaneously and automatically controls the position of adjustment of the distributor valve for varying the operation of the hydraulic motors.

18. In a pattern controlled milling machine having a tracer, a pattern, and a cutter adapted for relative movement, the combination of a pair of hydraulic motors for effecting said movement, an hydraulic medium for actuating the motors, a primary valve operatively associated with the tracer and shiftable by the tracer upon deflection of the tracer by the pattern, a distributor valve shiftable to a position corresponding to the position of the primary valve deflection for controlling the flow of the medium to the motors.

19. In a pattern controlled milling machine the combination with a tracer, a pattern, a tool and a work support adapted to have relative movement imparted thereto, of hydraulic motors for effecting such movement, hydraulic circuits for controlling the operation of the hydraulic motors including a distributor valve, and connections between the distributor valve and tracer whereby movement of the tracer by the pattern effects a proportional movement of the distributor valve throughout the range of movement of the tracer.

20. In a pattern controlled milling machine the combination with a tracer, a tool, a pattern and a work support adapted for relative movement, of hydraulic motors for effecting said movement, hydraulic circuits for controlling the movement of the motors and including a distributor valve adapted to be hydraulically actuated, a primary valve operable on deflection of the tracer for effecting the movement of the distributor valve in accordance with the movement of the tracer, a manually actuable valve in the circuit for effecting a movement of the distributor valve, and a valve for connecting either the tracer control valve or the manually actuable valve with the distributor valve.

21. In a pattern controlled milling machine the combination with a tracer, a tool, a pattern and a work support adapted for relative movement, of hydraulic motors for effecting said movement, hydraulic circuits for controlling the movement of the motors and including a distributor valve adapted to be hydraulically actuated, a primary valve operable on deflection of the tracer for effecting the movement of the distributor valve in accordance with the movement of the tracer, a manually actuable valve in the circuit for effecting a movement of the distributor valve, a valve for connecting either the tracer control valve or the manually actuable valve with the distributor valve, and manually actuable means for axially positioning the cutter and tracer relative to one another.

22. In a pattern controlled milling machine the combination with a tracer, a tool, a pattern and a work support adapted for relative movement, of hydraulic motors for effecting said movement, hydraulic circuits for controlling the movement of the motors and including a distributor valve adapted to be hydraulically actuated, a primary valve operable on deflection of the tracer for effecting the movement of the distributor valve in accordance with the movement of the tracer, a manually actuable valve in the circuit for effecting a movement of the distributor valve, a valve for connecting either the tracer control valve or the manually actuable valve with the distributor valve, manually actuable means for axially positioning the cutter and tracer relative to one another, and manually operable means for effecting an axial approach of the cutter and tracer.

23. In a die sinking machine of the class described the combination with a tracer, a pattern, a tool and a work support adapted for relative movement, of hydraulic motors for effecting such relative movement, hydraulic circuits for effecting the operation of the motors, said circuits including a common distributor valve adapted to determine the rate and direction of operation of the motors and adapted to be hydraulically adjusted, a manually operable positioning valve for effecting and determining the position of the distributor valve, and manual means for effecting the operation of the positioning valve.

24. In a fluid control system, the combination of a volumetrically constant source of fluid pressure, branch conduits leading therefrom, fluid resistance means for diversely impeding the rate of flow to said branch conduits for causing a predetermined pressure drop therein, opposed pistons connected respectively to said branch conduits for actuation by the reduced pressures therein, additional serially arranged fluid resistances in each conduit for impeding the rate of exhaust flow therefrom and thus modifying the respective reduced pressures in the conduits whereby the resultant pressures in the conduits will be equal when the ratio of said serial resistances is equal to the ratio of the first named resistances, a controller connected with the first named resistance means, a controlled part connected with said serial resistances and with said pistons whereby any movement of the controller and connected resistances will cause a proportionate movement of the controlled part and associated resistances through said pistons, said movement continuing until said serial resistances equalize the pressure in said conduits.

25. In a fluid control system the combination with a volumetrically constant source of fluid pressure, of branch conduits leading therefrom, a fluid resistance in each conduit, said resistances having a predetermined ratio therebetween, a second fluid resistance in each conduit having a ratio equal to the first named ratio whereby the pressures in said conduits are equal, and means automatically operable upon change in the ratio of the first named resistances to cause a corresponding change in the ratio of the remaining resistances whereby the pressures in said conduits will automatically be maintained equal.

26. In a fluid control system the combination with a volumetrically constant supply of fluid pressure, of branch conduits leading therefrom, interconnected means for establishing a fluid resistance in each branch having a predetermined ratio, additional interconnected means for establishing an additional serial fluid resistance in each channel having a ratio equal to the first named ratio whereby the conduit pressures will be equal, and means automatically operable upon ratio variation of one pair of interconnected resistances to cause a corresponding ratio change in the other pair of interconnected resistances whereby the ratio of the second pair of fluid resistances will always be maintained equal to the ratio of the first pair of fluid resistances.

27. In a fluid control system the combination of a volumetrically constant supply of fluid pressure, a pair of branch conduits leading therefrom, a variable fluid resistance in each conduit interconnected for simultaneous adjustment to establish different ratios therebetween, an additional variable fluid resistance in each branch conduit interconnected for simultaneous adjustment to a ratio equal to the ratio of the first named variable resistances to cause thereby equal pressures in the conduits, means to adjust the first named variable resistances to a new ratio and thus effect pressural changes in the respective conduits between the resistances therein, and means to utilize the pressural changes to vary said additional resistances to such an extent that they will equalize the pressure in said channels.

28. In a mechanism for transmitting proportionate movements from a tracer to a part controlled thereby, the combination of a pair of fluid channels extending from one to the other, each channel having a fluid resistance therein interconnected for adjustment by the tracer, an additional fluid resistance in each channel interconnected for adjustment by the controlled part, a pressure fluid supply source for maintaining a constant flow through the channels and the respective resistances to establish proportionate pressures in the channels, and means responsive to a pressure differential in said channels caused by inequality between the ratios of the respective pairs of resistances to re-equalize said ratios.

29. In a motion transmitting mechanism the combination with an actuator and an actuated part, of a pair of fluid channels extending from one to the other, means to maintain a constant flow through said channels, individual means associated with the actuator and with the actuated part to establish equal pressures in said channels, said means associated with the actuator being adjustable therewith to create a pressure differential between said channels, and means responsive to said pressure differential to effect movement of the actuated part and the means associated therewith until said differential is eliminated whereby for a given movement of the actuator a corresponding movement will be effected in the actuated part.

30. In a mechanism of the class described, a controller part, a controlled part, a pair of hydraulic channels extending from one part to the other, a source of fluid pressure for supplying said channels, fluid resistance means associated with the first part and co-operating fluid resistance means associated with the second named part effective to establish equal fluid pressures in the channels which is less than the supply pressure, said first resistance means being adjustable by movement of the controller part to unbalance the pressures in said channels, and means responsive to said pressure differential to cause continuous movement of the controlled part and variation of the resistance means associated therewith until the pressure differential is eliminated.

31. In a device of the class described, the combination of a controller member and a controlled member, a pair of fluid channels extending from one to the other, a source of pressure fluid for supplying said channels, means associated with the controller member for decrementally and incrementally changing the respective pressures in the channels in accordance with its movement, means responsive to said pressure changes to effect movement of the controlled member in accordance with the amount of said pressure differential whereby the members will be maintained in synchronized relation with one another.

32. In a device of the class described for maintaining a synchronized relation between a controller member and a controlled member, the combination of a pair of fluid channels extending between the members, means associated with the controller to effect a pressure differential between said channels in accordance with its movement, and means responsive to said pressure differential to effect movement of the controlled member in an amount depending upon the amount of said pressure differential whereby predetermined movement of the controller will effect a corresponding predetermined movement in the controlled member.

33. In a motion transmitting system, the combination with a controller member and a controlled member, of a pair of fluid channels extending from one to the other, a source of fluid pressure for supplying said channels, pressure differential creating means associated with the controller member and effective upon gradual movement thereof to effect a gradual change in the pressure differential between said channels, there being a definite gradation for each position of the controller member, a pressure differential varying means associated with the controlled member and responsive to a pressure differential in said channels created by the controller member for correspondingly moving the controlled member an amount necessary to reduce the pressure differential to zero and thereby take up a position in synchronized relation to the position of the controller member.

34. In a motion transmitting mechanism the combination with a controlled member and a controller member, of a first and second fluid channel extending from one to the other, means to supply fluid pressure to said channels, means associated with the members to establish equal pressures in said channels, said means including a first resistance in each channel connected for inverse variation upon opposite movement of the controller member to effect a greater pressure in one of the channels, said means also including a second resistance in each channel consociated with the controlled member, and means responsive to said greater pressure to effect movement of the controlled member, and thereby automatic adjustment of the second resistances to equalize the channel pressures and stop said controlled member movement.

35. A remote control mechanism for a shiftable rate determining part of a machine tool transmission, incremental movement of the part effecting infinitesimal variation of rate, said part being oppositely movable whereby the rate may be increased or decreased, comprising a distant controller for determining movement of the part to any position in either direction in accordance with movement of the controller including a pair of fluid channels extending from the controller to the part, a pair of opposed pistons connected to the respective channels for effecting actuation of the part, means to maintain a continuous flow through said channels, means associated with the controller upon movement thereof to create a greater pressure in the channel and on the piston which will effect movement of the part in the desired direction, and means associated with the part automatically effective upon movement thereof through a distance proportional to the movement of the controller to stop the movement of the part.

BERNARD SASSEN.